(12) United States Patent
Sagae et al.

(10) Patent No.: US 11,815,421 B2
(45) Date of Patent: Nov. 14, 2023

(54) ACOUSTIC MODE PROPAGATION SPEED MEASUREMENT METHOD AND ACOUSTIC MODE PROPAGATION SPEED MEASUREMENT DEVICE

(71) Applicant: NIPPON TELEGRAPH AND TELEPHONE CORPORATION, Tokyo (JP)

(72) Inventors: Yuto Sagae, Musashino (JP); Takashi Matsui, Musashino (JP); Kyozo Tsujikawa, Musashino (JP); Kazuhide Nakajima, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 144 days.

(21) Appl. No.: 17/434,949

(22) PCT Filed: Feb. 19, 2020

(86) PCT No.: PCT/JP2020/006395
§ 371 (c)(1),
(2) Date: Aug. 30, 2021

(87) PCT Pub. No.: WO2020/179440
PCT Pub. Date: Sep. 10, 2020

(65) Prior Publication Data
US 2022/0170817 A1 Jun. 2, 2022

(30) Foreign Application Priority Data
Mar. 4, 2019 (JP) ................................. 2019-038950

(51) Int. Cl.
*G01M 11/00* (2006.01)
(52) U.S. Cl.
CPC ................................. *G01M 11/319* (2013.01)

(58) Field of Classification Search
CPC ........................ G01M 11/3145; G01M 11/319
See application file for complete search history.

(56) References Cited

U.S. PATENT DOCUMENTS

| | | | | | |
|---|---|---|---|---|---|
| 4,781,425 | A | * | 11/1988 | Risk | ................... G02B 6/29302 359/287 |
| 5,062,117 | A | * | 10/1991 | Anthon | ................... H01S 3/025 372/75 |

(Continued)

FOREIGN PATENT DOCUMENTS

| JP | H09218319 A | 8/1997 |
|---|---|---|
| JP | 2017116423 A | 6/2017 |

OTHER PUBLICATIONS

Sagae, Matsui, Tsujikawa, and Nakajima "Yudo Buriruan Sakuran niyoru Hikari Faibagun Tienzikan Sokuteiho nikansuru Kento (Examination on Optical Fiber Group Delay Time Measurement Method by Stimulated Brillouin Scattering)," the Institute of Electronics, Information and Communication Engineers Society Meeting, B-13-13, Sep. 2018.

(Continued)

*Primary Examiner* — Sang H Nguyen
(74) *Attorney, Agent, or Firm* — Harness, Dickey & Pierce, P.L.C.

(57) ABSTRACT

An objective is to provide an acoustic mode propagation speed measurement method and an acoustic mode propagation speed measurement device capable of measuring a propagation speed of an acoustic mode without cutting or processing an optical fiber wire.

According to the present invention, an acoustic mode propagation speed measurement method includes: acquiring a frequency shift spectrum of Brillouin scattered light generated in an optical fiber; fitting the frequency shift spectrum using a Gauss function; acquiring a spectral full-width at half maximum w from a fitted curve using the Gauss (Continued)

function; and calculating a propagation speed $V_A$ of an acoustic mode of the optical fiber by substituting the acquired spectral full-width at half maximum w into a linear function of the spectral full-width at half maximum w and the propagation speed $V_A$ of the acoustic mode.

4 Claims, 10 Drawing Sheets

(56) References Cited

U.S. PATENT DOCUMENTS

| 5,537,671 | A * | 7/1996 | Toyama | G01C 19/72 |
|---|---|---|---|---|
| | | | | 385/27 |
| 2006/0093294 | A1 | 5/2006 | Manyam et al. | |
| 2006/0274320 | A1 | 12/2006 | Caplan | |
| 2013/0141721 | A1 * | 6/2013 | Bivolaru | G01N 21/72 |
| | | | | 356/338 |
| 2014/0299751 | A1 | 10/2014 | Tang et al. | |
| 2015/0168253 | A1 * | 6/2015 | Chin | G01M 11/3109 |
| | | | | 356/73.1\ |
| 2015/0308923 | A1 * | 10/2015 | Chin | G01M 11/085 |
| | | | | 356/73.1 |
| 2018/0259370 | A1 * | 9/2018 | Fontaine | G01D 5/35354 |

OTHER PUBLICATIONS

Y. Koyamada, S. Sato, S. Nakamura, H. Sotobayashi and W. Chujo, "Simulating and Designing Brillouin Gain Spectrum in Single-Mode Fibers," J. Lightwave Techol., vol. 22, No. 2, pp. 631-639, Feb. 2004.

N. Hayashi, Y. Mizuno, D. Koyama and K. Nakamura, "Dependence of Brillouin Frequency Shift on Temperature and Strain in Poly (methyl methacrylate)-Based Polymer Optical Fibers Estimated by Acoustic Velocity Measurement," Appl. Phys. Exp. 5, 032502, Mar. 2012.

A. Yeniay, J-M. Delavaux and J. Toulouse, "Spontaneous and Stimulated Brillouin Scattering Gain Spectra in Optical Fibers," J. Lightwave Technol., vol. 20, No. 8, pp. 1425-1432, Aug. 2002.

H. A. Ai-Asadi, M. H. Ai-Mansoori, S. Hitam, M. I. Saripan and M. A. Mandil "Brillouin Linewidth Characterization in Single Mode Large Effective Area Fiber through Co-Pumped Technique," IJECCT 2010, vol. 1, 1, pp. 16-20, 2010.

* cited by examiner

TABLE 1

|  | FIBER (a) | FIBER (b) | FIBER (c) |
|---|---|---|---|
| $V_A$ OBTAINED FROM EXPRESSION (1) | 5770 m/s | 5588 m/s | 5287 m/s |
| $V_A$ OBTAINED FROM EXPRESSION (2) | 5767 m/s | 5586 m/s | 5281 m/s |
| ERROR | 0.05% | 0.04% | 0.11% |

Fig. 10

TABLE 2

|  | FIBER (a) | FIBER (b) | FIBER (c) |
|---|---|---|---|
| $V_A$ OBTAINED FROM EXPRESSION (1) | 5770 m/s | 5588 m/s | 5287 m/s |
| $V_A$ OBTAINED FROM EXPRESSION (5) | 5782 m/s | 5557 m/s | 5301 m/s |
| ERROR | 0.28% | -0.56% | 0.28% |

ACOUSTIC MODE PROPAGATION SPEED MEASUREMENT METHOD AND ACOUSTIC MODE PROPAGATION SPEED MEASUREMENT DEVICE

CROSS-REFERENCE TO RELATED APPLICATIONS

This application is a 371 U.S. National Phase of International Application No. PCT/JP2020/006395 filed on Feb. 19, 2020, which claims priority to Japanese Application No. 2019-038950 filed on Mar. 4, 2019. The entire disclosures of the above applications are incorporated herein by reference.

TECHNICAL FIELD

The present disclosure relates to a method and a device for measuring acoustic mode propagation features of propagation in an optical fiber wire and an optical fiber of a laid cable.

BACKGROUND ART

In present optical networks, requests for reducing transmission delay times are becoming apparent. In particular, since propagation delay times caused due to optical fibers of long-distance communication lines are dominant, group delay times of optical fibers have attracted attention. In measurement of the conventional art, an impulse response method of obtaining a group delay time by allowing a receiver to detect light incident from an optical pulse transmitter after the light passes through an optical fiber and measuring a propagation time has been used. On the other hand, in recent years, a scheme using backward Brillouin scattering has been proposed. Since single-end measurement of an optical fiber can be performed unlike the scheme of the related art, application of a laid optical fiber is expected (NPL 1).

In a measurement scheme using backward Brillouin scattering, it is necessary to specify a speed at which light propagates in an optical fiber in an acoustic mode of a longitudinal wave contributing to scattering of the light. There are two schemes for specifying a propagation speed of an acoustic mode contributing to scattering of light:

(1) a method of obtaining a propagation speed empirically from a core refractive index measurement value of an optical fiber in NPL 2; and
(2) a method of radiating an ultrasonic pulse introduced in NPL 3.

The method (1) can be implemented by measuring a refractive index distribution of an optical fiber. The method (2) can be implemented by installing an optical fiber to be measured in a pedestal so that a cross-sectional surface of the optical fiber faces an ultrasonic pulse emission device and calculating a reception time difference between an ultrasonic pulse passing through the optical fiber to be measured and reflected from the pedestal and an ultrasonic pulse reflected from the pedestal without passing through the optical fiber.

CITATION LIST

Non Patent Literature

[NPL 1] Sagae, Matsui, Tsujikawa, and Nakajima "*Yudô Buriruan Sakuran niyoru Hikari Faibâgun Tienzikan Sokuteihô nikansuru Kentô* (Examination on Optical Fiber Group Delay Time Measurement Method by Stimulated Brillouin Scattering)," the Institute of Electronics, Information and Communication Engineers Society Meeting, B-13-13, September 2018

[NPL 2] Y. Koyamada, S. Sato, S. Nakamura, H. Sotobayashi and W. Chujo, "Simulating and Designing Brillouin Gain Spectrum in Single-Mode Fibers," J. Lightwave Techol., Vol. 22, No. 2, pp. 631-639, February, 2004.

[NPL 3] N. Hayashi, Y. Mizuno, D. Koyama and K. Nakamura, "Dependence of Brillouin Frequency Shift on Temperature and Strain in Poly (methyl methacrylate)-Based Polymer Optical Fibers Estimated by Acoustic Velocity Measurement," Appl. Phys. Exp. 5, 032502, March, 2012.

[NPL 4] A. Yeniay, J-M. Delavaux and J. Toulouse, "Spontaneous and Stimulated Brillouin Scattering Gain Spectra in Optical Fibers," J. Lightwave Technol., Vol. 20, No. 8, pp. 1425-1432, August, 2002.

[NPL 5] H. A. Al-Asadi, M. H. Al-Mansoori, S. Hitam, M. I. Saripan and M. A. Mandil "Brillouin Linewidth Characterization in Single Mode Large Effective Area Fiber through Co-Pumped Technique," IJECCT 2010, Vol. 1, 1, pp. 16-20, 2010.

SUMMARY OF THE INVENTION

Technical Problem

In the methods (1) and (2), cutting or processing of an optical fiber wire is necessary in order to measure a propagation speed of an acoustic mode before or after backward Brillouin scattering measurement. Therefore, in the methods (1) and (2), there is the problem that it is difficult to measure a propagation speed of the acoustic mode in an optical fiber to be measured such as an optical fiber in a laid cable or the like, on which cutting or processing of an optical fiber wire cannot be performed. Accordingly, in order to solve the foregoing problem, an objective of the present invention is to provide an acoustic mode propagation speed measurement method and an acoustic mode propagation speed measurement device capable of measuring a propagation speed of an acoustic mode without cutting or processing an optical fiber wire.

Means for Solving the Problem

To achieve the foregoing objective, it is assumed that, in the acoustic mode propagation speed measurement method and the acoustic mode propagation speed measurement device according to aspects of the present invention, a propagation speed of an acoustic mode is calculated by analyzing a backward Brillouin scattering spectrum generated in an optical fiber by incidence of test light.

According to NPL 2, it is reported that both a propagation speed of a longitudinal acoustic wave and a lifetime of the acoustic wave are proportional to a dosage of impurities in a propagation medium. Therefore, a propagation speed of an acoustic mode of a longitudinal wave propagating through a core of an optical fiber and contributing to scattering of light is considered to have proportional correlation with the lifetime. When a full-width at half maximum of the backward Brillouin scattering spectrum is considered to be determined in accordance with the lifetime of the acoustic mode, the propagation speed of the acoustic mode of the longitudinal wave contributing to scattering of light is considered to have proportional correlation with the full-width at half maximum of the backward Brillouin scattering spectrum. Accordingly, by analyzing the full-width at half maximum or the lifetime of the acoustic mode from the backward Brillouin scattering spectrum, it is possible to measure the propagation speed of the acoustic mode contributing to scattering of light.

Specifically, according to the present invention, a first acoustic mode propagation speed measurement method includes: acquiring a frequency shift spectrum of Brillouin scattered light generated in an optical fiber; fitting the frequency shift spectrum using a Gauss function; acquiring a spectral full-width at half maximum w from a fitted curve using the Gauss function; and calculating a propagation speed $V_A$ of an acoustic mode of the optical fiber by substituting the acquired spectral full-width at half maximum w into a linear function of the spectral full-width at half maximum w and the propagation speed $V_A$ of the acoustic mode.

A first acoustic mode propagation speed measurement device that performs a first acoustic mode propagation speed measurement method includes: a reception unit configured to acquire a frequency shift spectrum of Brillouin scattered light generated in an optical fiber; an analysis unit configured to fit the frequency shift spectrum using a Gauss function and acquire a spectral full-width at half maximum w from a fitted curve using the Gauss function; and a calculation unit configured to calculate a propagation speed $V_A$ of an acoustic mode of the optical fiber by substituting the acquired spectral full-width at half maximum w into a linear function of the spectral full-width at half maximum w and the propagation speed $V_A$ of the acoustic mode.

At this time, the linear function may be an expression C1:

[Math. C1]

$$V_A = A_1 w + B_1, \quad (C1)$$

where $-159.8 \leq A_1 \leq -124.6$, and $$6992 \leq B_1 \leq 7397.$$

On the other hand, according to the present invention, a second acoustic mode propagation speed measurement method includes: acquiring a frequency shift spectrum of Brillouin scattered light generated in an optical fiber; fitting the frequency shift spectrum using a function of an expression C2; acquiring a lifetime $\tau$ of an acoustic mode from a curve fitted by the function; and calculating the propagation speed $V_A$ of the acoustic mode of the optical fiber by substituting the acquired lifetime $\tau$ of the acoustic mode into a linear function of the lifetime $\tau$ of the acoustic mode and the propagation speed $V_A$ of the acoustic mode,

[Math. C2]

$$S(f) = A\exp\left(\frac{G\left(\frac{\Gamma/2\pi}{2}\right)^2}{f^2 + \left(\frac{\Gamma/2\pi}{2}\right)^2} - 1\right) \quad (C2)$$

where A and G are fitting parameters, S(f) is a spectrum intensity, f is a frequency, $\Gamma$ is an attenuation factor of the acoustic mode, and the lifetime $\tau$ of the acoustic mode is $\tau = 1/\Gamma$.

A second acoustic mode propagation speed measurement device that performs a second acoustic mode propagation speed measurement method includes: a reception unit configured to acquire a frequency shift spectrum of Brillouin scattered light generated in an optical fiber; an analysis unit configured to fit the frequency shift spectrum using a function of an expression C2 and acquire a lifetime $\tau$ of an acoustic mode from a curve fitted by the function; and a calculation unit configured to calculate the propagation speed $V_A$ of the acoustic mode of the optical fiber by substituting the acquired lifetime $\tau$ of the acoustic mode into a linear function of the lifetime $\tau$ of the acoustic mode and the propagation speed $V_A$ of the acoustic mode.

At this time, the linear function may be an expression C3:

[Math. C3]

$$V_A = A_2\tau + B_2, \quad (C3)$$

where $354.5 \leq A_2 \leq 376.9$, and $$3840 \leq B_2 \leq 3939.$$

The aspects of the present invention can be combined where possible.

Effects of the Invention

According to the present invention, it is possible to provide the acoustic mode propagation speed measurement method and the acoustic mode propagation speed measurement device capable of measuring a propagation speed of an acoustic mode without cutting or processing an optical fiber wire.

DESCRIPTION OF EMBODIMENTS

Embodiments of the present invention will be described with reference to the appended drawings. The embodiments to be described below are examples of the present invention and the present invention is not limited to the following embodiments. In the present specification and the drawings, constituent elements that have the same reference numerals are assumed to be the same as each other.

First Embodiment

An acoustic mode propagation speed measurement method according to the embodiment is optical fiber single-end measurement by full-width at half maximum analysis of a backward Brillouin scattering spectrum and has the three following features. According to the first feature, the acoustic mode propagation speed measurement method according to the embodiment includes acquiring a frequency shift spectrum of Brillouin scattered light generated in an optical fiber; and fitting the frequency shift spectrum using a Gauss function.

According to the second feature, the acoustic mode propagation speed measurement method according to the embodiment includes acquiring a spectral full-width at half maximum w from a fitted curve using the Gauss function.

According to the third feature, the acoustic mode propagation speed measurement method according to the embodiment includes calculating a propagation speed $V_A$ of an acoustic mode of the optical fiber by substituting the acquired spectral full-width at half maximum w into a linear function of the spectral full-width at half maximum w and the propagation speed $V_A$ of the acoustic mode.

Figure 1:
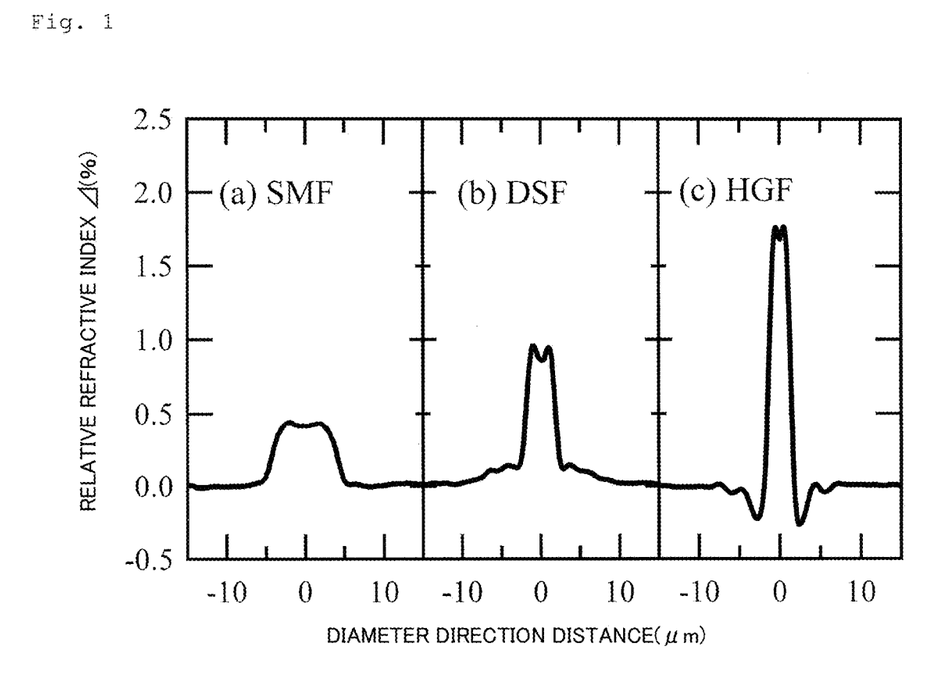
FIG. 1 is a diagram illustrating a measurement result of an optical fiber refractive index distribution.

FIG. 1 illustrates a refractive index distribution in an optical fiber diameter direction obtained by measuring a plurality of optical fibers that have $GeO_2$-doped cores. An optical fiber (a) is a general-purpose single mode optical fiber (SMF), an optical fiber (b) is a distributed shift optical fiber (DSF), and an optical fiber (c) is a high-$GeO_2$-doped core optical fiber (HGF) that has a trench layer by fluoridation.

Figure 2:
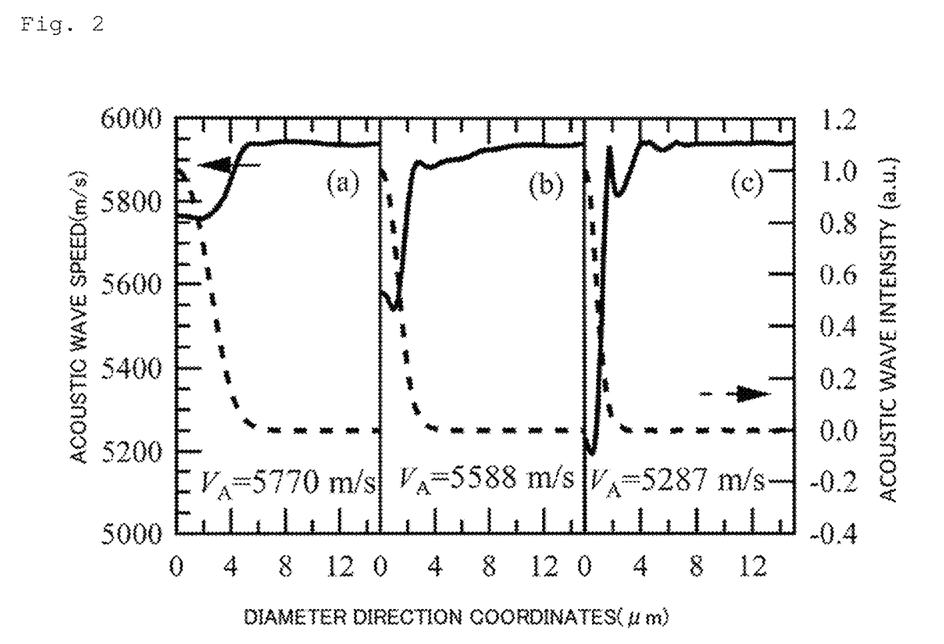
FIG. 2 is a diagram illustrating a calculation result of an acoustic wave speed distribution of an optical fiber and a calculation result of a intensity distribution of an acoustic mode contributing to scattering of light.

FIG. 2 illustrates an acoustic wave speed distribution (the left axis, a solid line) of an optical fiber diameter direction of the optical fibers (a) to (c) calculated based on an empirical expression of a refractive index and an acoustic wave speed described in NPL 2. Simultaneously, an acoustic mode intensity distribution (the right axis, a broken line) calculated based on the acoustic wave speed distribution by a finite element method is illustrated. The propagation speed $V_A$ of an effective acoustic mode in an optical fiber can be calculated by an overlapping integral of Math. (1) using a speed distribution Vl(r) and a intensity distribution I(r). The obtained propagation speed $V_A$ is expressed in Math. (1) based on the acoustic wave speed distribution of the optical fiber in each drawing.

[Math. 1]

$$V_A = \frac{\int_0^\infty V_l(r)I(r)rdr}{\int_0^\infty I(r)rdr} \quad (1)$$

Figure 3:
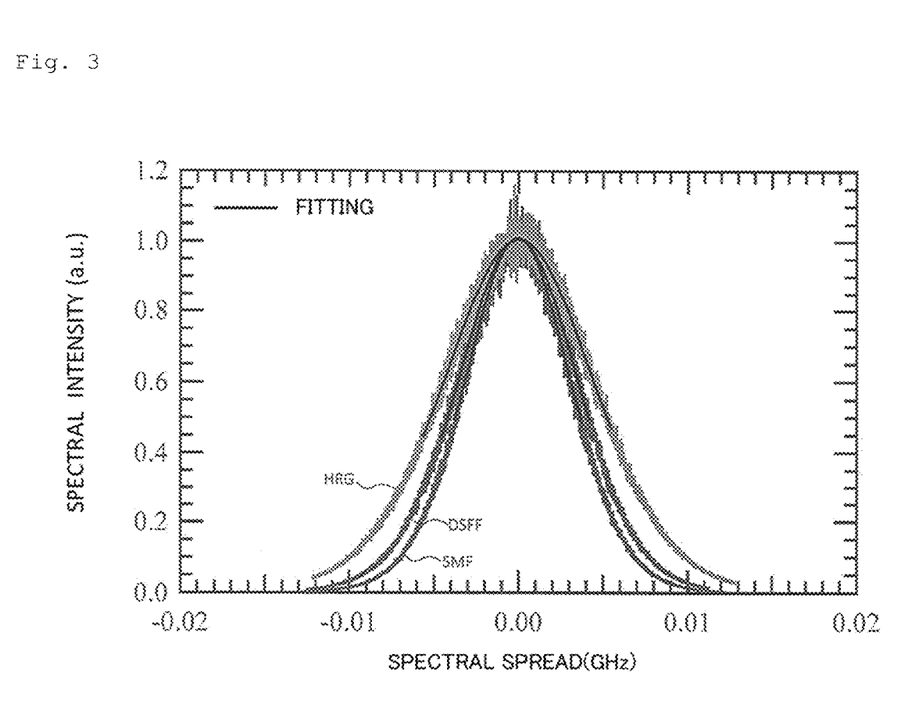
FIG. 3 is a diagram illustrating an acquisition example and an analysis example of a backward Brillouin scattering spectrum acquired by an acoustic mode propagation speed measurement method according to the present invention.

FIG. 3 illustrates a measurement waveform of a backward Brillouin scattering spectrum measured in the optical fibers (a) to (c). Here, incident light is set as continuous light with a wavelength of 1.55 μm. According to NPL 4, when a test light intensity is a sufficiently high strength, the backward Brillouin scattering spectrum is known to be of a Gaussian type. A solid line in FIG. 1 is a fitting curve by a Gauss function. In a section in which a spectral intensity is −3 dB with respect to a peak intensity, the backward Brillouin scattering spectrum of a certain optical fiber can be fitted well. Accordingly, it is possible to analyze the spectral full-width at half maximum w from fitting parameters of the Gauss function.

Figure 4:
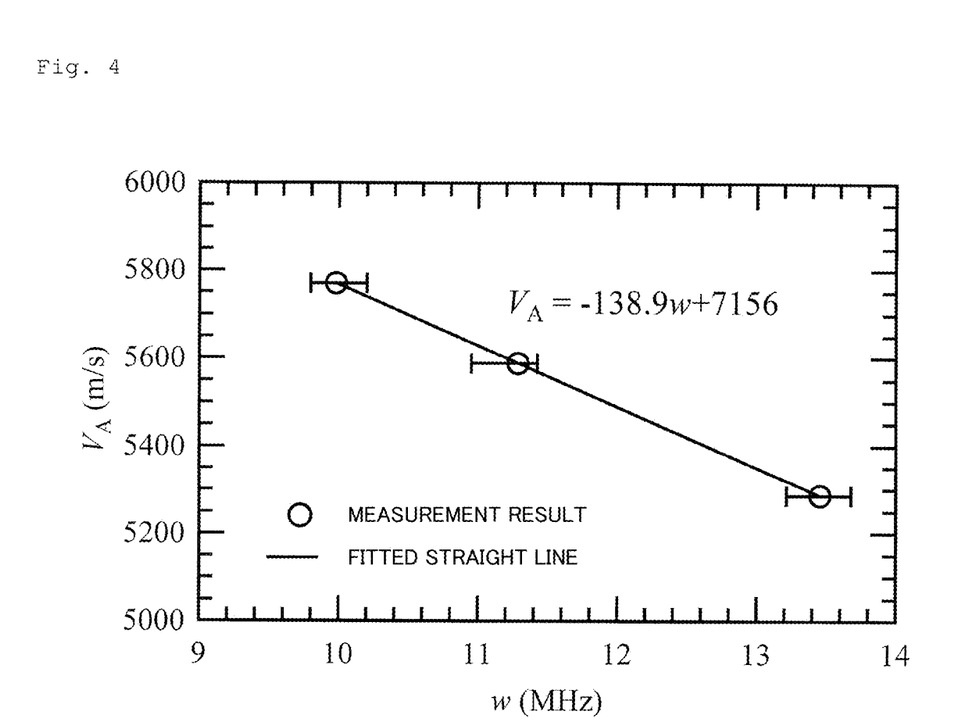
FIG. 4 is a feature diagram illustrating correlation between a line width of the backward Brillouin scattering spectrum and a propagation speed of the acoustic mode calculated by the acoustic mode propagation speed measurement method according to the present invention.

FIG. 4 is a correlation diagram in which the full-width at half maximum w of the backward Brillouin scattering spectrum analyzed in FIG. 2 in the optical fibers (a) to (c) is the horizontal axis and the propagation speed $V_A$ of the acoustic mode calculated in Math. (1) is the vertical axis. The full-width at half maximum w and the propagation speed $V_A$ of the effective acoustic mode have a negative correlation. The full-width at half maximum w changes within a range of an error bar and the solid line in the drawing is an example of a fitted straight line and is expressed in the following relational expression.

[Math. 2]

$$V_A = -138.9w + 7156 \quad (2)$$

In consideration of the change in the full-width at half maximum w, when the relational expression of $V_A$ and w is $V_A = A_1 w + B_1$, a value of the following range is taken.

[Math. 3]

$$-159.8 \leq A_1 \leq -124.6 \quad (3)$$

$$6992 \leq B_1 \leq 7397$$

Figure 9:
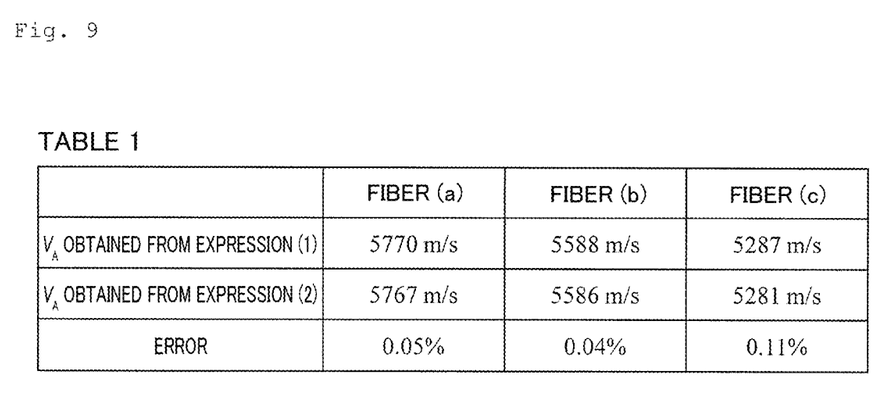
FIG. 9 is a table for comparing calculation values calculated by a known method with propagation speeds of the acoustic mode calculated by the acoustic mode propagation speed measurement method according to the present invention.

Table 1 of FIG. 9 shows a propagation speed of the acoustic mode obtained from the propagation speed of the acoustic mode calculated with Math. (1) and the spectral full-width at half maximum by Math. (2) in the optical fibers (a) to (c). An error of both parameters is less than 1.0% and it can be understood that the propagation speed of the acoustic mode calculated in Math. (1) can be calculated from the spectral full-width at half maximum with high accuracy in Math. (2). According to NPL 5, the full-width at half maximum of the backward Brillouin scattering spectrum is reported to be changed in accordance with an optical fiber length. However, since the change is saturated in a long optical fiber with a length equal to or greater than 10 km, it is preferable to implement the method in an optical fiber with a length equal to or greater than 10 km. As described above, it is possible to obtain the spectral full-width at half maximum through analysis of the backward Brillouin scattering spectrum and obtain a propagation speed of an effective acoustic mode contributing to scattering of light.

Figure 5:
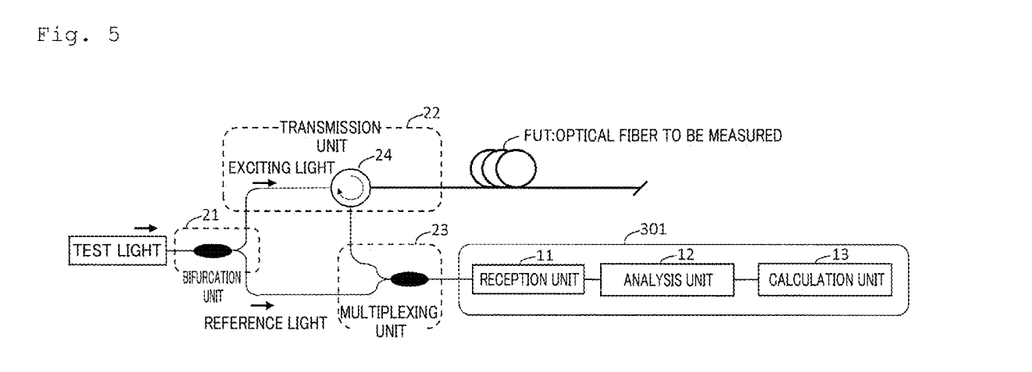
FIG. 5 is a diagram illustrating an acoustic mode propagation speed measurement device according to the present invention.

FIG. 5 is a diagram illustrating an example of a configuration of an acoustic mode propagation speed measurement device 301 realizing the acoustic mode propagation speed measurement method. The acoustic mode propagation speed measurement device 301 includes a reception unit 11, an analysis unit 12, and a calculation unit 13. The reception unit 11 acquires a frequency shift spectrum of Brillouin scattered light generated in an optical fiber. The analysis unit 12 fits the frequency shift spectrum using the Gauss function and acquires the spectral full-width at half maximum w from the curve fitted by the Gauss function. The calculation unit 13 calculates the propagation speed $V_A$ of the acoustic mode of the optical fiber by substituting the acquired spectral full-width at half maximum w into a linear function of the spectral full-width at half maximum w and the propagation speed $V_A$ of the acoustic mode.

Test light from a laser light source that has a strength for causing backward Brillouin scattering is bifurcated into exciting light and reference light by a bifurcation unit 21. The exciting light is incident on an optical fiber FUT to be measured from the transmission unit 22, and thus backward scattered light is generated. The backward scattered light is multiplexed with the reference light by the multiplexing unit 23 via an optical circulator 24. The reception unit 11 receives beat light and measures a spectrum of the beat light (a frequency shift spectrum of the Brillouin scattered light). The analysis unit 12 analyzes the full-width at half maximum w of the frequency shift spectrum using the Gauss function. The calculation unit 13 calculates an acoustic mode propagation speed by the relational expression $V_A = A_1 w + B_1$ of $V_A$ and w using coefficients of Math. (3).

According to the measurement method of the embodiment, it is possible to realize nondestructive inspection of an optical fiber because it is unnecessary to perform cutting or processing on the optical fiber for measuring the propagation speed of the acoustic mode.

Second Embodiment

An acoustic mode propagation speed measurement method according to the embodiment is optical fiber single-end measurement by acoustic mode lifetime analysis of a backward Brillouin scattering spectrum and has the three following features. According to the first feature, the acoustic mode propagation speed measurement method according to the embodiment includes acquiring a frequency shift spectrum of Brillouin scattered light generated in an optical fiber, and fitting the frequency shift spectrum using a function of Math. (4). According to the second feature, the acoustic mode propagation speed measurement method according to the embodiment includes acquiring a lifetime τ of the acoustic mode from a curve fitted by the function. According to the third feature, the acoustic mode propagation speed measurement method according to the embodiment includes calculating the propagation speed $V_A$ of the acoustic mode of the optical fiber by substituting the acquired lifetime τ of the acoustic mode into a linear function of the lifetime τ of the acoustic mode and the propagation speed $V_A$ of the acoustic mode.

Figure 6:
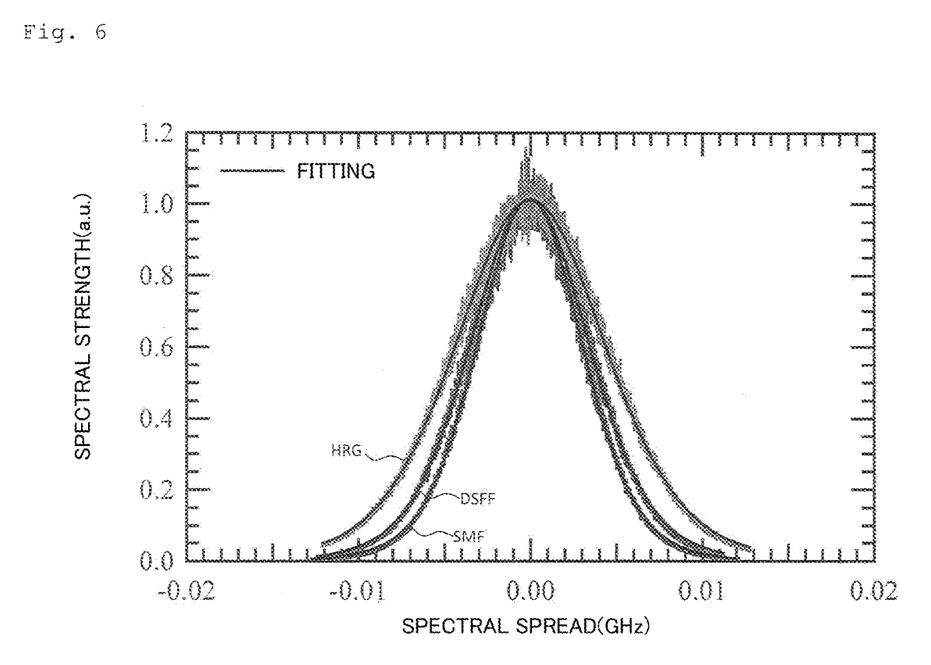
FIG. 6 is a diagram illustrating an acquisition example and an analysis example of a backward Brillouin scattering spectrum acquired by an acoustic mode propagation speed measurement method according to the present invention.

In general, a line width of the Brillouin scattering spectrum is known to depend on a lifetime of the acoustic mode contributing to scattering of light. FIG. 6 illustrates a result obtained by fitting the backward Brillouin scattering spectrum measured in the optical fiber to be measured in FIG. 1 using the following function capable of analyzing an acoustic mode lifetime reported in NPL 5.

[Math. 4]

$$S(f) = A\exp\left(\frac{G\left(\frac{\Gamma/2\pi}{2}\right)^2}{f^2 + \left(\frac{\Gamma/2\pi}{2}\right)^2} - 1\right) \quad (4)$$

Here, S(f) is a spectrum intensity of each frequency, A and G are fitting parameters, and f is a frequency. Γ is an attenuation factor of the acoustic mode, and the lifetime τ of the acoustic mode is τ=1/Γ. From FIG. 6, a measurement result can be known to be expressed by Math. (4).

Figure 7:
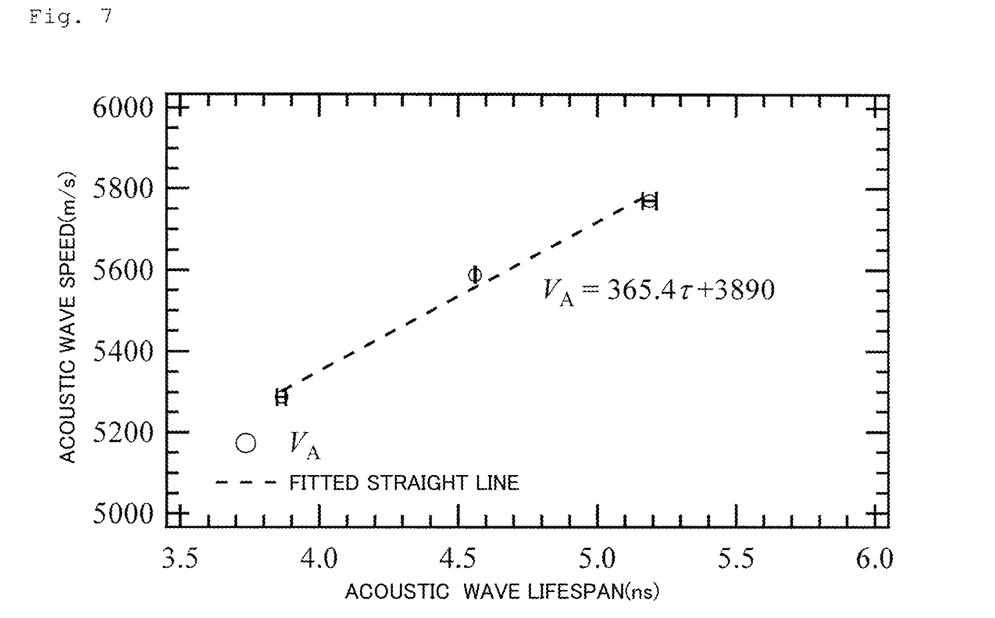
FIG. 7 is a feature diagram illustrating correlation between a lifetime of the acoustic mode and a propagation speed of the acoustic mode calculated by the acoustic mode propagation speed measurement method according to the present invention.

FIG. 7 is a correlation diagram in which the lifetime τ of the acoustic mode analyzed in FIG. 6 is the horizontal axis and the propagation speed $V_A$ of the acoustic mode calculated in Math. (1) is the vertical axis. Both parameters indicate linear correlation and match correlation suggested from an empirical expression of NPL 2. The lifetime τ of the acoustic mode changes within a range of an error bar and a solid line in the drawing is an example of a fitted straight line and is expressed in the following relational expression.

[Math. 5]

$$V_A = 365.4\tau + 3890 \quad (5)$$

In consideration of the change in the lifetime τ of the acoustic mode, when the relational expression of $V_A$ and τ is $V_A = A_2\tau + B_2$, and values in the following ranges are used.

[Math. 6]

$$354.5 \le A_2 \le 376.9 \quad (6)$$
$$3840 \le B_2 \le 3939$$

Figure 10:
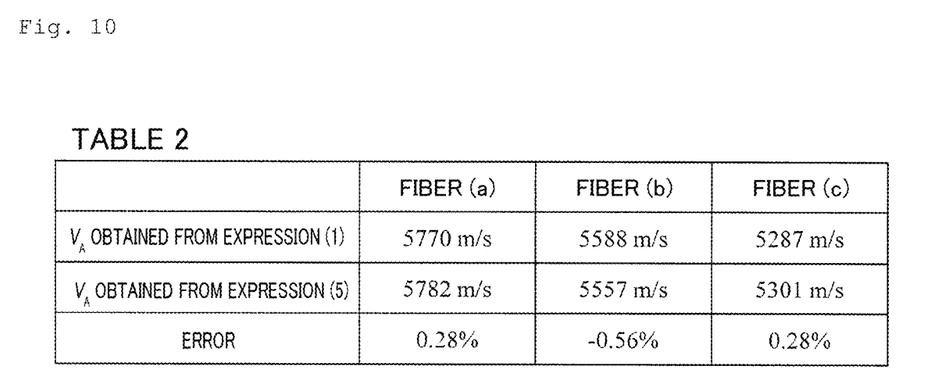
FIG. 10 is a table for comparing calculation values calculated by a known method with propagation speeds of the acoustic mode calculated by the acoustic mode propagation speed measurement method according to the present invention.

Table 2 of FIG. 10 shows the propagation speed of the acoustic mode calculated with Math. (1) and a propagation speed of the acoustic mode obtained from the lifetime of the acoustic mode by Math. (5) in the optical fibers (a) to (c). It can be understood that an error of both parameters is less than 1.0% and the propagation speed of the acoustic mode calculated in Math. (5) can be calculated from the lifetime of the acoustic mode obtained through analysis of the backward Brillouin scattering spectrum with high accuracy in Math. (1). As in the first embodiment, it is preferable to implement the measurement method of the present invention in a long optical fiber with a length equal to or greater than 10 km. As described above, it is possible to obtain the lifetime of the acoustic mode through analysis of the backward Brillouin scattering spectrum and obtain a propagation speed of an acoustic mode contributing to scattering of light.

It is possible to realize the acoustic mode propagation speed measurement method in the configuration of the acoustic mode propagation speed measurement device 301 in FIG. 5. In this case, in the acoustic mode propagation speed measurement device 301, the analysis unit 12 fits the frequency shift spectrum using the function of Math. (4) and acquires the lifetime τ of the acoustic mode from the curve fitted by the function, and the calculation unit 13 calculates the propagation speed $V_A$ of the acoustic mode of the optical fiber by substituting the acquired lifetime τ of the acoustic mode into a linear function of the lifetime τ of the acoustic mode and the propagation speed $V_A$ of the acoustic mode.

The analysis unit 12 calculates the lifetime τ of the acoustic mode from the spectrum of the beat light (the frequency shift spectrum of the Brillouin scattered light) received by the reception unit 11 using Math. (4). The calculation unit 13 calculates the acoustic mode propagation speed by the relation expression $V_A = A_2 \tau + B_2$ of $V_A$ and τ using the coefficients of Math. (6).

According to the measurement method of the embodiment, it is possible to realize nondestructive inspection on an optical fiber because it is unnecessary to perform cutting or processing on the optical fiber for measuring the propagation speed of the acoustic mode.

Third Embodiment

Figure 8:
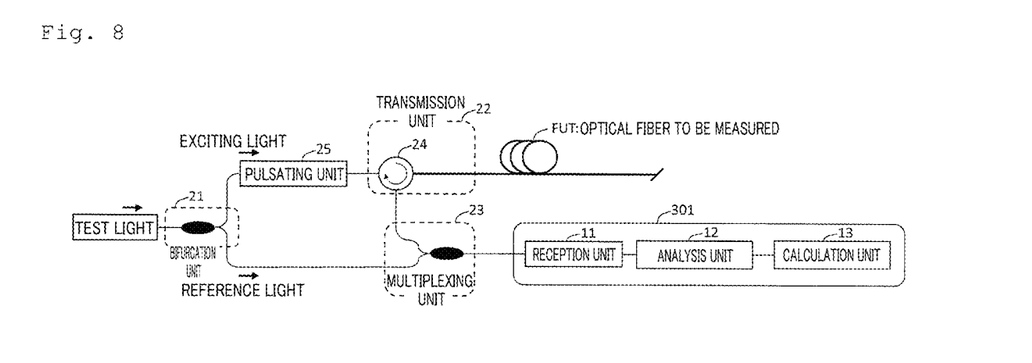
FIG. 8 is a diagram illustrating the acoustic mode propagation speed measurement device according to the present invention.

FIG. 8 is a diagram illustrating an example of a configuration of an acoustic mode propagation speed measurement device 301 realizing the acoustic mode propagation speed measurement method according to the embodiment. In the embodiment, distribution measurement of a propagation speed of the acoustic mode in which BOTDA is used will be described. A difference between a measurement system of this embodiment and a measurement system of the first and second embodiments is that the measurement system of this embodiment includes a pulsating unit 25 that pulsates exciting light.

Test light from a laser light source that has a strength for causing backward Brillouin scattering is bifurcated into exciting light and reference light by the bifurcation unit 21. The exciting light is pulsated by the pulsating unit 25 and is incident on the optical fiber FUT to be measured from the transmission unit 22. The backward scattered light scattered by the exciting light is multiplexed with the reference light by the multiplexing unit 23 via the optical circulator 24. The acoustic mode propagation speed measurement device 301 performs the spectrum analysis described in the first or second embodiment. Since the exciting light is pulsated, a distribution of the propagation speed of the acoustic mode contributing to scattering of light can be obtained with regard to an optical fiber to be measured.

INDUSTRIAL APPLICABILITY

The present invention can be used for feature evaluation of an optical fiber or a measurement technology using an optical fiber.

The acoustic mode propagation speed measurement device according to the present invention can also be realized by a computer and a program. The program can be recorded on a recording medium or can also be provided via a network.

REFERENCE SIGNS LIST

11 Reception unit
12 Analysis unit
13 Calculation unit
21 Bifurcation unit
22 Transmission unit
23 Multiplexing unit
24 Optical circulator
25 Pulsating unit
301 Acoustic mode propagation speed measurement device

The invention claimed is:

1. An acoustic mode propagation speed measurement method comprising: acquiring a frequency shift spectrum of Brillouin scattered light generated in an optical fiber; fitting the frequency shift spectrum using a Gauss function; acquiring a spectral full-width at half maximum w from a fitted curve using the Gauss function; and calculating a propagation speed $V_A$ of an acoustic mode of the optical fiber by substituting the acquired spectral full-width at half maximum w into a linear function of the spectral full-width at half maximum w and the propagation speed $V_A$ of the acoustic mode.

2. The acoustic mode propagation speed measurement method according to claim 1, wherein the linear function is an expression C1:

[Math. C1]

$$V_A = A_1 w + B_1,$$

$$\text{where } -159.8 \leq A_1 \leq -124.6, \text{ and}$$

$$6992 \leq B_1 \leq 7397,$$

where $V_A$ is the propagation speed of the acoustic mode, w is full-width at half maximum, A1 is a slope of the propagation speed, and B1 is intercept of the propagation speed.

3. An acoustic mode propagation speed measurement device comprising: a reception unit configured to acquire a frequency shift spectrum of Brillouin scattered light generated in an optical fiber; an analysis unit configured to fit the frequency shift spectrum using a Gauss function and acquire a spectral full-width at half maximum w from a fitted curve using the Gauss function; and a calculation unit configured to calculate a propagation speed $V_A$ of an acoustic mode of the optical fiber by substituting the acquired spectral full-width at half maximum w into a linear function of the spectral full-width at half maximum w and the propagation speed $V_A$ of the acoustic mode.

4. The acoustic mode propagation speed measurement device according to claim 3, wherein the linear function is an expression C1:

[Math. C1]

$$V_A = A_1 w + B_1,$$

$$\text{where } -159.8 \leq A_1 \leq -124.6, \text{ and}$$

$$6992 \leq B_1 \leq 7397,$$

where $V_A$ is the propagation speed of the acoustic mode, w is full-width at half maximum, A1 is a slope of the propagation speed, and B1 is intercept of the propagation speed.

* * * * *